United States Patent [19]

Sileo et al.

[11] Patent Number: 5,780,116
[45] Date of Patent: Jul. 14, 1998

[54] METHOD FOR PRODUCING AN ABRADABLE SEAL

[75] Inventors: Gerard A. Sileo, Jupiter; John W. Appleby, Palm Beach Gardens; Stephen T. Narsavage, Jupiter; Francis X. Alent, Port St. Lucie; Charles G. Davis, Jupiter, all of Fla.

[73] Assignee: United Technologies Corporation, Hartford, Conn.

[21] Appl. No.: 863,414

[22] Filed: May 27, 1997

Related U.S. Application Data

[60] Continuation of Ser. No. 569,412, Dec. 6, 1995, abandoned, which is a division of Ser. No. 145,896, Oct. 29, 1993, Pat. No. 5,536,022, which is a continuation-in-part of Ser. No. 572,271, Aug. 24, 1990, abandoned.

[51] Int. Cl.6 .............................. C23C 4/06; C23C 4/10
[52] U.S. Cl. .............................. 427/456; 427/455
[58] Field of Search .................... 427/455, 456; 428/614, 613, 632, 937, 680; 415/173.4, 174.4; 277/235 A, 236, 53, DIG. 6, 936, 940, 943, 415

[56] References Cited

U.S. PATENT DOCUMENTS

| | | |
|---|---|---|
| 3,084,064 | 4/1963 | Cowden et al. ............... 117/71 |
| 4,696,855 | 9/1987 | Pettit, Jr. et al. ............... 427/456 |
| 4,731,302 | 3/1988 | Weissmantel et al. ............... 428/698 |
| 4,743,514 | 5/1988 | Strangman et al. ............... 427/456 |
| 4,783,341 | 11/1988 | Packer et al. ............... 427/8 |
| 5,358,753 | 10/1994 | Rao et al. ............... 427/456 |

FOREIGN PATENT DOCUMENTS

| | | |
|---|---|---|
| 0229936 | 7/1987 | European Pat. Off. . |
| 0311847A2 | 4/1989 | European Pat. Off. . |

OTHER PUBLICATIONS

Japanese Patent Abstract, Publication No. JP1242786, published Sep. 27, 1989.
Japanese Patent Abstract, Publication No. JP3096601, published Apr. 22, 1991.

*Primary Examiner*—Katherine A. Bareford
*Attorney, Agent, or Firm*—Brooks Haidt Haffner & Delahunty

[57] ABSTRACT

A gas turbine abradable seal is prepared by plasma spraying an oxidation resistant metallic material and boron nitride. The resultant structure comprises a metallic matrix encompassing a lubricating amount of boron nitride, with porosity of less than about 15 percent and a fabricated surface roughness of less than about 600 microinches. The reduced surface roughness and substantially reduced permeability of this seal provide substantially enhanced engine efficiency, and improved durability.

13 Claims, 4 Drawing Sheets

METHOD FOR PRODUCING AN ABRADABLE SEAL

CROSS REFERENCE TO RELATED APPLICATION

This is a continuation of Ser. No. 08/569,412 filed on Dec. 6, 1995, now abandoned, which is a division of Ser. No. 08/145,896 filed on Oct. 29, 1993, now U.S. Pat. No. 5,536,022, which is a continuation-in-part of Ser. No. 07/572,271, filed on Aug. 24, 1990, now abandoned.

FIELD OF THE INVENTION

The present invention relates to plasma sprayed abradable seals for use in gas turbine engines, and more particularly to plasma sprayed metal matrix abradable seals containing boron nitride.

BACKGROUND OF THE INVENTION

Large gas turbine engines are widely used for aircraft propulsion and for ground based power generation. Such large gas turbine engines are of the axial type, and include a compressor section, a combustor section, and a turbine section, with the compressor section normally preceded by a fan section. Each of the fan, compressor, and turbine sections comprises a plurality of disks mounted on a shaft, with a plurality of airfoil shaped blades projecting radially therefrom. A hollow case surrounds the various engine sections. Located between the disks and projecting inward from the case assembly which surrounds the disks are a plurality of stationary vanes. During operation of the fan, compressor, and turbine sections, axially flowing gases alternately contact moving blades and the stationary vanes. In the fan and compressor sections, air is compressed and the compressed air is combined with fuel and burned in the combustion section to provide high pressure, high temperature gases which flow through the turbine section, where energy is extracted by causing the bladed turbine disks to rotate. A portion of this energy is used to operate the compressor section and the fan section.

Engine efficiency depends to a significant extent upon minimizing leakage by control of the gas flow in such a manner as to maximize interaction between the gas stream and the moving and stationary airfoils. A major source of inefficiency is leakage of gas around the tips of the compressor blades, between the blade tips and the engine case. Accordingly, means to improve efficiency by reduction of leakage are increasingly important. Although a close tolerance fit may be obtained by fabricating the mating parts to a very close tolerance range, this fabrication process is extremely costly and time consuming. Further, when the mated assembly is exposed to a high temperature environment and high stress, as when in use, the coefficients of expansion of the mating parts may differ, thus causing the clearance space to either increase or decrease. The latter condition would result in a frictional contact between blades and housing, causing elevation of temperatures and possible damage to one or both members. On the other hand, increased clearance space would permit gas to escape between the compressor blade and housing, thus decreasing efficiency.

One means to increase efficiency is to apply a coating of suitable material to the interior surface of the compressor housing, to reduce leakage between the blade tips and the housing. Various coating techniques have been employed to coat the inside diameter of the compressor housing with an abradable coating that can be worn away by the frictional contact of the compressor blade, to provide a close fitting channel in which the blade tip may travel. Thus, when subjecting the coated assembly to a high temperature and stress environment, the blade and the case may expand or contract without resulting in significant gas leakage between the blade tip and the housing. This abradable coating technique has been employed to not only increase the efficiency of the compressor, but to also provide a relatively speedy and inexpensive method for restoring excessively worn turbine engine parts to service.

As generally mentioned in U.S. Pat. Nos. 3,879,831 to Rigney et al. and 3,084,064 to Cowden et al, abradable seals must have a peculiar combination of properties. They must be resistant to erosion from the high velocity, high temperature gas streams which at times may carry fine particulate matter with them. However, they must also be subject to removal (i.e. abrading) when contacted by the tip of a high speed blade, so that the tip of the blade is not degraded. It is critical that the housing coating abrade rather than wear the blade tip, since a decrease in blade tip size will increase clearance between the blade tip and the housing all around the circumference, resulting in a greater increase in gas leakage than would result from abrasion of only a small arc of the coating around the circumference of the housing. Conventionally, the tip of the blade is coated with a highly erosion resistant material.

The abradable coating must also be structurally sound to resist failure at points other than where contacted by the blade tip, must resist the thermal and vibratory strains imposed upon it in use, and must be readily fabricated in a reproducible and cost efficient manner. Considerable effort has gone into the development of abradable seals having the desired combination of properties. The present invention is reflective of that continuing effort.

One form of abradable seal developed in the past was a porous structure, obtained by use of a fugitive material in the precursor article. In the prior art, pressing and sintering and other metallurgical techniques have been used together with thermal spraying to produce porous structures. Metal deposits with densities as low as 75–85 percent may be applied by plasma spraying. However, to obtain densities lower than this, which were formerly believed to be desirable for abradable seals, it was necessary to incorporate non-metallic materials. Most preferably, a fugitive material such as a water soluble salt or a heat-decomposable polymer was sprayed with the metal, and then subsequently removed. For example, an abradable seal structure is prepared in accordance with the teachings of Otfinoski et al, U.S. Pat. No. 4,664,973, who teaches spraying a polymethylmethacrylate resin and a nichrome metal, and then removing the resin by heating the resultant structure to a temperature of about 315° C.

Another form of abradable seal is that prepared by the teachings of Rigney et al. U.S. Pat. No. 3,879,831. This patent discloses an abradable material having a composition of 60–80 percent nickel, 2–12 percent chromium, 1–10 percent cobalt, 4–20 percent aluminum, and 3–15 percent inert material such as diatomaceous earth, boron nitride, silica glass, mica, etc. Up to 3 percent of a metal such as yttrium, hafnium, or lanthanum may also be present. The abradable materials produced by this reference are characterized by a high degree of porosity, oxidation resistance, low thermal conductivity, and the ability to be abraded away cleanly in a localized area.

Similarly, U.S. Pat. No. 3,084,064 deals with the preparation of abradable coatings on turbine surfaces by flame spraying nichrome and from 2 to 20 weight percent of a finely divided powder of a high melting material such as boron nitride, carbon, graphite, or magnesium oxide. The abradable characteristics of this coating are believed to be due to the dispersed material preventing formation of a solid, dense, strongly cohesive metal phase. In other words, the high melting powder permits the surface to easily flake off in relatively uniform particles when subjected to an abrading force.

Although these various methods produce abradable coatings usable for turbine applications and the like, they have disadvantages of either providing coatings which are hard to chip off in small discreet amounts by friction contact so as to provide a well defined blade tip channel having no large cavities through which gases may escape, or producing an interconnected porous surface layer which in itself permits the escape of gases, thus lowering efficiency.

Accordingly, it is an objective of the present invention to provide an improved seal system which contributes to engine efficiency by providing a compressor seal, which while abradable and smooth, is impermeable to gas flow. It is a further object of the present invention to provide a compressor seal comprising plasma sprayed metal matrix, a lubricating amount of boron nitride second phase, and porosity which is not interconnected.

SUMMARY OF THE INVENTION

According to the present invention, an improved plasma sprayed abradable seal is provided by plasma spraying a mixture of oxidation resistant metallic particles and boron nitride particles, utilizing multiple port injection. The boron nitride, which does not melt under atmospheric conditions but sublimes at about 5200° F., is essentially unaffected by the plasma spray process. The abradable mixture of oxidation resistant metal and boron nitride includes only from about 5 to about 15 percent by volume porosity, as opposed to prior art abradable compressor seals which typically contained 30 percent or more porosity. Further, the plasma sprayed metallic seals described in this invention have a surface roughness of less than about 600 microinches and typically have a surface roughness as applied of about 150 microinches, and after operation of the engine, a typical surface roughness of from about 100 to about 600 microinches. Prior art plasma sprayed porous abradable seals typically have had surface roughness in the as applied state which ranged from about 600 to about 800 microinches, with surface roughness typically 1000 to 1200 microinches after engine operation. This significant improvement in surface roughness, and elimination of interconnected porosity, greatly improves compressor efficiency, by up to 1.0%, or higher. In the present invention, the boron nitride may be regarded as filling most of the porosity found in previously used porous metallic sprayed abradable seals, as well as acting as a lubricant. Thus, permeation through the seal, and back leakage of gas is eliminated. Such elimination of permeation also increases durability of the seal, and decreases internal surface oxidation of the seal, particularly at elevated temperatures.

The present invention not only includes an abradable seal product but also the process for making the same, and more particularly encompasses a method wherein a bond layer is applied to the surface of an assembly, such as the inner case, by plasma spraying a dense, low porosity layer of an oxidation resistant superalloy, followed by over coating the bond coat with a low porosity plasma sprayed layer of a blend of the same oxidation resistant superalloy and sufficient hexagonal boron nitride lubricant powder to provide an abradable seal having from 20 to 45 volume percent boron nitride. The plasma spray application of both the bond layer and the abradable layer is by multiple port plasma gun, controlled so as to provide an abradable seal layer having less than 15 volume percent porosity.

The foregoing and other features and advantages of the present invention will become more apparent from the following descriptions.

DESCRIPTION OF THE INVENTION

The present invention relates to seals having particular utility in gas turbine engines, particularly those of the axial flow type. Such engines include alternate rows of stationary vanes and moving blades with the blades being attached at the periphery of shaft mounted rotating disks.

Figure 1:
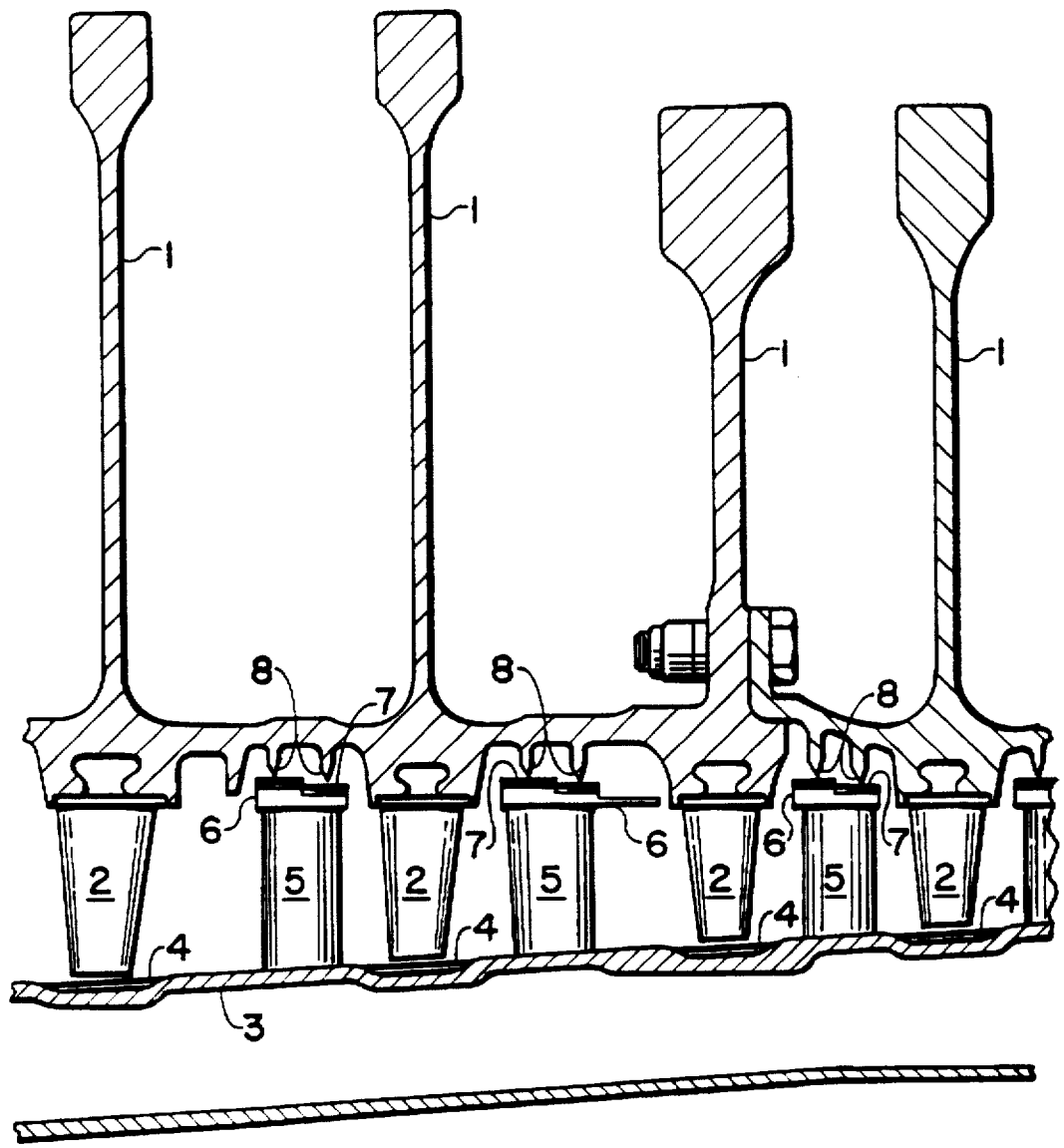
FIG. 1 illustrates a cross-section of a typical gas turbine engine.

FIG. 1 illustrates a cross-section of a portion of a modern gas turbine engine. Components important to understanding the present invention include a plurality of rotatable disks 1 upon whose outer periphery are mounted a plurality of blades 2. The blades rotate within the inner case 3 and are closely spaced thereto. Minimum leakage between the blades and the inner case is achieved by the provision of a seal 4 (the outer air seal), mounted on the inner case.

Mounted within and upon the inner case 3 are a plurality of vanes 5 on whose inner, free ends 6 is mounted another seal 7 (the inner air seal) which is closely spaced to knife edges 8 mounted on extensions of the disks 1. The knife edge 8 and inner air seal 7 cooperate to reduce leakage and improve efficiency. In an alternate engine scheme, the disks do not have integral projections, but are separated by spacers upon which knife edges may be mounted.

The abradable seals of the present invention are typically seal 4, located on the inner case 3 adjacent to the free ends of the blades 2 (the outer air seal), and seal 7, on the free ends 6 of the vanes 5 (the inner air seal). The seals of the present invention are preferably mounted on stationary substrates arranged to engage moving components.

The requirements for abradable seals for gas turbine engines include abradability, spall resistance, and erosion resistance. In addition, due to increasing demand for improved performance, economy, and durability, abradable seals are also required to exhibit gas impermeability, smooth surface, and oxidation resistance at high temperatures. In the case of abradability, the seal is the sacrificial element, and it is desirable to minimize blade wear. Spallation resistance is desirable to eliminate domestic object damage, i.e. damage to the blades or other engine components by materials separated from internal surfaces. Erosion resistance is required to maintain clearances throughout the life of the engine, and thus maintain performance characteristics. Conventional commercial turbine engines have exhibited a two percent increase in air flow around blade tips as a result of seal erosion after approximately 3000 flights. Much of this may be attributed to erosion of the abradable seal and blade airfoil surface, and to rub interactions between the blade tips and the seal. Additionally, gas impermeability is required to minimize flow through the seal itself. It has been shown that impermeable seals with a smooth surface finish improve overall compressor efficiency by about one percent as compared to conventional permeable seals. In addition, impermeability of the seal prevents fine particle, e.g. dust or grit, entrapment which can act as an abrasive against the blade tips, thus wearing them unevenly. Smooth surface finishes in the gas path improve overall airflow, also contributing to efficiency. Finally, oxidation resistance is required due to increases in compressor operating temperatures, which are expected to reach 1400° F. to 1600° F. in the foreseeable future. Long term oxidation resistance also improves the erosion rate of abradable materials.

The abradable seal of the present invention is applied by use of a plasma spray process, with plasma spray conditions preferably selected to provide a high energy plasma spray to minimize porosity and control density, thereby essentially eliminating permeability. Preferably, a multiple port plasma gun, such as that shown in U.S. Pat. No. 4,696,855, incorporated herein by reference, is utilized. This gun allows injection of the matrix metal powder and the boron nitride powder at different points, thus permitting the metal to be in the plasma for a shorter period of time, while the more refractory boron nitride is in the plasma for a longer period of time. Use of a high energy plasma gun reduces coating porosity, to a level of preferably less than fifteen volume percent, and substantially increases erosion resistance and homogeneity. The flame sprayed process which has been used to apply abradable coatings in the prior art is a lower energy process which typically produces coatings with thirty to sixty volume percent porosity. In contrast, the metal content of the coating prepared in accordance with the present invention is from about 50 to about 65 volume percent, and the coating has a bulk density greater than about 3.6 grams/cc, preferably from about 3.7 to about 5.3 grams/cc, and most preferably from about 3.8 to 5.2 grams/cc.

Use of a multiple port plasma spray gun permits in situ mixing of the constituents of the abradable seal, and permits the seal material to be tailored to suit the engine application and environment. For example, in military engine applications, where gas path velocities are relatively high, erosion resistance is of paramount importance. Seal density, and thus erosion resistance and abradability, can be varied in situ by varying the ratio of constituents delivered to the plasma spray torch. Power input to the plasma torch may also be varied in situ to tailor seal properties. In general, erosion resistance may be increased by increasing interparticulate bonding by increasing power levels. This, however, will decrease abradability. The use of independent powder injection and carrier gas flows for each constituent permits the component materials to be injected at optimal locations for their physical and thermal properties. High temperature refractory materials may be injected deep into the central core of the plasma, while less refractory materials may be injected into cooler regions, thus minimizing excess heating and thermal stress build-up in the coating.

A key element in plasma spray technology is the interaction between the injected powder material and the plasma plume, in terms of heat transfer and dwell time. In order to efficiently deposit plasma sprayed coatings, the optimal choice of coating parameters and injector configuration must be made. Particle distributions within the plasma jet are of particular importance due to effect upon coating density, quality, deposit efficiency, and reproducibility. It has been found that increasing the number of particle injection points into the plasma spray plume tends to increase the distribution of the particles in the central core of the plasma, and thus provide more uniform particle heating and dwell times. This is of particular importance when depositing relatively refractory materials, such as boron nitride. For the present invention, the maximum practical number of injection ports, three metallic and three boron nitride, has been utilized to take advantage of this phenomenon.

The fact that the ratios of constituent materials may be varied in situ makes this process suitable for automation and control by intelligent processing. In situ measurements of coating density by gamma back spatter or radiation attenuation may be fed to computer algorithms and a process controller to accomplish ratio control. Automated measurement of thickness, such as by capacitance eddy current measurement, taken in conjunction with measurement of constituent flow, enables automatic determination of seal density, which may be established as the acceptance criteria.

The plasma spray application of the metallic and boron nitride constituents may be carried out using conventional commercially available multiple port plasma spray torches. Preferably, a multiple injection face plate incorporating three injection ports for the boron nitride and three injection ports for the metallic constituent is used. In addition, it is helpful for the face plate to incorporate automatic cleaning ports to inject air, or an inert gas, to periodically clean the powder ports. In this manner, the process was continued until the entire desired thickness of abradable was deposited. Spray processing may be achieved, with the application of material in excess of 0.100 inches thick, using such apparatus, with acceptable thermal stress build-up and no seal spallation. Thus, we have been able to obtain thick homogeneous coatings exhibiting proper structure and adhesion strength. Whereas thermally sprayed seals of the past have improved initial performance, the plasma sprayed seals of the present invention provide sustained performance benefits over the life of the engine. As indicated, the seal density may be used as the quality acceptance criteria. Since this property correlates well to seal performance, provided that the plasma spray parameters are held within preset tolerance bands. The best method to determine seal density is by way of a non-destructive gauge in which gamma radiation is passed through the abradable layer and the attenuation of the radiation intensity is measured and subsequently used to calculate seal density. Such a gauge is taught in U.S. Pat. No. 4,783,341, issued Nov. 8, 1988, to Janowsky et al. Destructive techniques, such as ASTM C-20, may also be utilized to evaluate test tabs produced during a plasma spray operation. Preferably, boron nitride is provided in the form of a powder having a particle size ranging from about 44 to 177 microns, and the oxidation resistant metallic material is provided in the form of particles having particle size of from 44 to 150 microns, preferably from 44 to 105 microns. The boron nitride is a self-lubricating stable filler which is abradable, having a relatively soft crystalline structure, being a hexagonal material which shears readily. A permanent filler, which is resistant to the environment encountered in a gas turbine engine, and which is thermally stable at temperatures up to about 1600° F., boron nitride is present in a lubricating amount, preferably from about 20 to 45 volume percent of the abradable layer.

The oxidation resistant matrix material must have a superior combination of mechanical properties at elevated temperature and resistance to oxidation at elevated temperatures. Creep strength at 1200° F. should be comparable to that of such superalloys designated in the industry as MarM 200, IN 100, Inconel 718, Waspaloy, Astroloy, Udimet 500, Hastaloy X, Inconel 625, and other alloys of like nature and composition.

Suitable matrix metals include those nickel based superalloys having high oxidation resistance, preferably exceeding that of Nichrome at 1200° F., and particularly those which demonstrate oxidation resistance as a result of the addition of various combinations of yttrium and hafnium. It has been found that benefits in terms of oxidation resistance nay be achieved when yttrium is present within the range of from 0.001 to 0.8 weight percent, and hafnium is present in a range of from 0.10 to about 1.5 weight percent. Such materials exhibit resistance to rapid oxidation, i.e. do not ignite when exposed to severe rub conditions. Abradable seals of such material do not ignite titanium fires when interacting under severe conditions with blades prepared from titanium alloys.

Suitable matrix materials having oxidation resistance exceeding that of nichrome at 1200° F. include the following alloys, as set forth in Table 1:

TABLE 1

SUITABLE MATRIX MATERIALS

|  | Alloy 1 | | Alloy 2 | | Alloy 3 | |
| --- | --- | --- | --- | --- | --- | --- |
|  | min | max | min | max | min | max |
| Chromium | 5.0 | 18.0 | 24.00 | 26.00 | 15.00 | 19.00 |
| Aluminum | 3.0 | 8.0 | 5.50 | 6.50 | 11.80 | 13.20 |
| Hafnium | 0.1 | 1.0 | 0.50 | 1.50 | 0.10 | 0.40 |
| Yurium | 0.001 | 0.09 | 0.05 | 0.15 | 0.40 | 0.80 |
| Titanium | 0 | 5.0 | — | — | — | — |
| Cobalt | 0 | 20.0 | — | — | 20.00 | 24.00 |
| Tungsten | 0 | 15.0 | 7.50 | 8.50 | — | — |
| Molybdenum | 0 | 4.0 | — | — | — | — |
| Tantalum | 0 | 12.0 | 3.50 | 4.50 | — | — |
| Zirconium | 0 | 0.2 | — | — | — | — |
| Boron | 0 | 0.2 | — | — | — | — |
| Carbon | 0 | 0.2 | 0.20 | 0.25 | — | 0.02 |
| Silicon | — | — | — | — | 0.20 | 0.60 |
| Rhenium | 0 | 7.0 | — | — | — | — |
| Columbium | 0 | 5.0 | — | — | — | — |
| Iron | — | 0.2 | — | — | — | — |
| Copper | — | 0.1 | — | — | — | — |
| Phosphorous | — | 0.01 | — | 0.01 | — | 0.010 |
| Sulfur | — | 0.01 | — | 0.01 | — | 0.010 |
| Lead | — | 0.005 | — | — | — | 0.0025 |
| Bismuth | — | 0.001 | — | — | — | 0.0001 |
| Manganese | — | 0.05 | — | — | — | — |
| Nickel + Trace Elements | Remainder | | Remainder | | Remainder | |

Thus, oxidation resistant nickel base superalloys suitable for the present invention encompass a wide range of compositions inclusive of both hafnium and yttrium. Broadly, the alloys may comprise, by weight, 5–26 percent chromium, 3–13.2 percent aluminum, 0.1–1.5 percent hafnium, 0.001–0.80 percent yttrium, 0–5.0 percent titanium, 0–24.00 percent cobalt, 0–15.00 percent tungsten, 0–4.0 percent molybdenum, 0–12.0 percent tantalum, 0–0.2 percent zirconium, 0–0.2 percent boron, 0–0.25 percent carbon, 0–0.60 percent silicon, 0–7.0 percent rhenium, 0–5.0 percent columbium, 0–0.2 percent iron, 0–0.1 percent copper, from 0–0.05 percent of each of phosphorous, sulfur, lead, bismuth, and manganese, and the balance essentially nickel and trace elements.

The improvements in oxidation resistance which have been obtained through the addition of coordinated amounts of yttrium and hafnium to nickel-based superalloys have been observed in material which has been produced by powder metallurgy techniques involving rapid solidification. By rapid solidification, it is intended to designate material which is subjected to a cooling rate of greater than about $10^4$° C. per second. The benefits of rapid solidification include the essential elimination of segregation, which is important because when dealing with only 50 or 100 parts per million (0.005 to 0.010 percent) of an element, it is critical for oxidation resistance that the element be uniformly distributed throughout the alloy and not locally segregated. Accordingly, the preferred matrix powders for plasma spraying are rapidly solidified nickel based superalloy powders having both yttrium and hafnium present, in suitable concentrations to achieve high oxidation resistance. We prefer an alloy containing, by weight, 5–18 percent Cr, 3–8 percent Al, 0.1–1.0 percent Hf, 0.001–0.09 percent Y, 0–5 percent Ti, 0–20 percent Co, 0–15 percent W, 0–4 percent Mo, 0–12 percent Ta, 0–0.2 percent Zr, 0–0.2 percent B, 0–0.2 percent C, 0–7 percent Re, 0–5 percent Cb, 3–9 percent (Al+Ti), the sum of (W+Ta+Mo+Cb+Re) exceeding 5 percent, and the balance essentially Ni. The ratio of matrix metal to boron nitride in the abradable seal should fall within the range of 50–65 volume percent metal, 20–45 volume percent boron nitride, with 5–15 volume percent porosity, with the porosity being non-interconnected, thereby limiting permeability. In accordance with the present invention, as previously set forth, it has also been found that the bulk density of the seal should be greater than about 3.6 grams/cc, preferably from about 3.7 to about 5.3 grams/cc, and most preferably from about 3.8 to about 5.2 grams/cc. The relationship of these parameters is shown in Table II, wherein the content of boron nitride is given in volume percent for corresponding bulk densities and porosities.

TABLE II

BORON NITRIDE CONTENT OF SEAL

| Bulk Density, | | Volume Percent Porosity | | |
| --- | --- | --- | --- | --- |
| (gm/cc) | Volume Percent Metal | 5% | 10% | 15% |
| 5.3 | 66 | 29 | 24 | 19 |
| 5.2 | 65 | 30 | 25 | 20 |
| 5.1 | 64 | 31 | 26 | 21 |
| 5.0 | 63 | 32 | 27 | 22 |
| 5.0 | 62 | 33 | 28 | 23 |
| 4.9 | 61 | 34 | 29 | 24 |
| 4.8 | 60 | 35 | 30 | 25 |
| 4.7 | 59 | 36 | 31 | 26 |
| 4.6 | 58 | 37 | 32 | 27 |
| 4.6 | 57 | 38 | 33 | 28 |
| 4.5 | 56 | 39 | 34 | 29 |
| 4.4 | 55 | 40 | 35 | 30 |
| 4.4 | 54 | 41 | 36 | 31 |
| 4.3 | 53 | 42 | 37 | 32 |
| 4.3 | 52 | 43 | 38 | 33 |
| 4.3 | 51 | 44 | 39 | 34 |
| 3.8 | 50 | 45 | 40 | 35 |
| 3.5 | 49 | 46 | 41 | 36 |
| 3.5 | 48 | 47 | 42 | 37 |

A non-abradable bond coat comprising an oxidation resistant metal is applied prior to the application of the abradable coating. Most preferably, this bond coat comprises the same metal as the matrix metal of the abradable layer, thus reducing galvanic corrosion activity between the bond coat and the abradable coating layer and is applied by plasma spraying. A typical bond coat thickness is from about 2 to about 20 mils, with a preferred thickness of from 7 to 12 mils. The bond coat is preferably of a density greater than 90 percent of theoretical, does not contain boron nitride, and exhibits low abradability relative to the boron nitride containing abradable layer. Generally, the particle size of the bond coat material may be the same as or of a larger size fraction than that of the abradable layer, so as to provide a rougher surface and a basis for greater adhesion of the abradable layer. The combined use of a non-abradable base layer of oxidation resistant superalloy and a low porosity coating, having a lubricating amount of boron nitride, provides a seal with operating capabilities up to about 1600° F., which meets the projected maximum temperature requirements of advanced jet turbine compressors for the near future.

The non-abradable bond coat is considered to be highly beneficial when applied to any metal substrate, and is particularly important and useful in the circumstance where the substrate being coated is titanium, since the bond coat also functions as a barrier layer, inhibiting penetration of the blade and preventing incursion into the titanium. It is critical to reduce the possibility of titanium contacting titanium since this is known to cause a substantial wear problem, and the possibility of sustained titanium combustion. The metal substrate may be prepared for application of the plasma sprayed bond coat layer in known conventional manner.

Following the application of the non-abradable bond coat, the abradable layer is applied, in a thickness of about 10 to about 200 mils, and preferably from about 20 to 100 mils. After completion of the plasma deposition process, the coating may be stress relieved, for example at 1000° to 1400° F. for one to ten hours, preferably at 1200° F. for two to six hours, and machined to a surface roughness of less than 200 microinches.

EXAMPLE 1

A comparative example was conducted to evaluate the porosity of a flame sprayed coating with a plasma sprayed coating in accordance with the present invention. A high-porosity nickel-chromium-aluminum-boron nitride composite, comprising Metco 301C-NS powder, used extensively for high temperature abradable coatings, was combustion sprayed onto a substrate to produce a Metco T301 coating, and subjected to measurement of porosity. A similar coating of an oxidation resistant matrix material plus boron nitride, in accordance with the present invention, was plasma sprayed onto a similar substrate. The parameters and porosities of these coatings are as set forth in Table III, showing typical volume percentages. The coating of the present invention was considerably less porous.

TABLE III

FLAME SPRAYED VS. PLASMA SPRAYED COATINGS

|  | Flame Spray | | Plasma Spray | |
| --- | --- | --- | --- | --- |
|  | Powder | Coating | Powder | Coating |
| BN | 18% | 10% | 47% | 30% |
| Metal | 82% | 50% | 53% | 60% |
| Porosity | — | 40% | — | 10% |

The flame spray composite was produced using a metal powder having the following composition specification (weight percent):

|  | Min | Max |
| --- | --- | --- |
| Chromium | 11.50 | 16.00 |
| Iron | 6.00 | 9.50 |
| Boron Nitride | 3.50 | 7.50 |
| Aluminum | 2.50 | 4.50 |
| Silicon Dioxide | — | 4.00 |

-continued

|  | Min | Max |
| --- | --- | --- |
| Organic Solids | — | 4.00 |
| Nickel | 60.00 | — |

The particle size distribution (sieve size) was (+100), 1 percent maximum; (+120), 10.0 percent maximum; and (−325), 15 percent maximum.

The composition of the matrix material used for the plasma sprayed coating was, in percent by weight, as follows:

|  | Min | Max |
| --- | --- | --- |
| Chromium | 8.0 | 10.0 |
| Aluminum | 6.6 | 7.0 |
| Tungsten | 9.0 | 10.0 |
| Tantalum | 2.5 | 3.5 |
| Molybdenum | 0.1 | 1.2 |
| Hafnium | 0.1 | 0.2 |
| Yttrium | 0.01 | 0.08 |
| Carbon | — | 0.02 |
| Silicon | — | 0.09 |
| Phosphorous | — | 0.005 |
| Sulfur | — | 0.005 |
| Lead | — | 2 ppm |
| Bismuth | — | 0.5 ppm |
| Manganese | — | 0.02 |
| Iron | — | 0.1 |
| Copper | — | 0.05 |
| Nickel | Balance | |

The particle size distribution (sieve size) was (+140), 1 percent maximum; (+170), 7 percent maximum; (−170, +200), 38–48 percent; (−200, +230), 34–44 percent; (−230, +270), 10–20 percent; (−270), 4 percent maximum; and (−325), 1 percent maximum.

The boron nitride component of the plasma sprayed coating comprised (weight percent):

|  | Min | Max |
| --- | --- | --- |
| Boron Nitride | 98.0 | — |
| Oxygen | — | 0.6 |
| Carbon | — | 0.2 |
| Other impurities | — | 0.3 |

The particle size distribution (sieve size) of the boron nitride was (+80), 2 percent maximum; (−80, +200), 80 percent minimum; (−200, +325), 16 percent maximum; and (−325), 2 percent maximum. The boron nitride comprised 47 volume percent of the plasma spray powder.

The plasma sprayed coating was applied using a Metco 7 MB plasma spray gun, with a metal powder feed rate of 150 grams per minute and a boron nitride feed rate of 45 grams per minute. The current was set at 470 amps, with a voltage of 78–80 volts, using nitrogen as a primary gas at 33±3 SLP/M, and hydrogen as a secondary gas. The coating was applied to a thickness of about 0.115 inches.

It has been shown that plasma spraying inherently produces less porosity and that the deposition efficiency of the constituents is significantly greater than that of the flame spray process. Thus, one obtains a much denser, less porous coating (5–15 volume percent, or less, versus 30–60 volume percent) utilizing plasma spray than one would obtain by flame spraying the same materials. It should also be noted that due to weaker metal-to-metal bonding and greater porosity in the flame sprayed coatings, flame sprayed materials are typically less erosion resistant than plasma sprayed materials.

EXAMPLE 2

Previous abradable coatings, as indicated, have sought high porosity and low density, in contrast to those of the present invention, which do not depend upon porosity to provide effective abradability rates. Table IV illustrates blade tip rub results for boron nitride filled seals with different metal contents made as set forth in Example 1, with the addition of a bond coat of the matrix metal. The surface finish set forth is that of the rub zone.

TABLE IV

ABRADABILITY RUB RIG TEST RESULTS

| TEST NO. | SEAL DENSITY (gm/cc) | WEAR INDEX | SURFACE FINISH (Microinches) | COMMENT |
|---|---|---|---|---|
| A) SMOOTH IMPERMEABLE SEAL | | | | |
| 1 | 4.0 | 0.002 | 598 | Acceptable |
| 2 | 4.1 | 0.002 | 683 | Acceptable |
| 3 | 4.1 | 0.002 | 605 | Acceptable |
| 4 | 4.3 | 0.002 | 573 | Acceptable |
| 5 | 4.3 | 0.002 | 473 | Acceptable |
| 6 | 4.3 | 0.002 | 255 | Acceptable |
| 7 | 4.3 | 0.020 | 327 | Acceptable |
| 8 | 4.3 | 0.030 | 430 | Acceptable |
| 9 | 4.5 | 0.001 | 269 | Acceptable |
| 10 | 4.5 | 0.040 | 62 | Acceptable |
| 11 | 4.8 | 0.090 | 268 | Acceptable |
| 12 | 5.2 | 0.001 | 78 | Acceptable |
| 13 | 5.2 | 0.020 | 91 | Acceptable |
| 14 | 5.6 | 0.070 | 63 | High Temp. |
| 15 | 5.6 | 0.055 | 75 | High Temp. |
| 16 | 5.6 | 0.030 | 53 | High Temp. |
| B) CONVENTIONAL POROUS ABRADABLE SEAL | | | | |
| 17 | 4.5 | 0.040 | 29 | Cracked |
| 18 | 5.1 | 0.060 | 27 | Cracked |

In Table IV, the Wear Index represents the average blade wear divided by the sum of rub depth and blade wear, whereby a lower value is to be preferred, and an index less than 0.1 is desired and less than 0.05 is preferred. When compared to standard porous abradable seals, the boron nitride lubricant filled seals of this invention were found to have equal or better abradability, as measured by wear index, while the porous abradable seals were found to be unacceptable due to their lack of lubricity, which resulted in high temperature and seal cracking due to friction.

Thus, it may be seen that the boron nitride lubricant of the present invention minimizes severe rub interactions which occur between blade tip and seal surface. Such interaction during certain engine operating conditions can significantly increase seal temperatures above ambient, which can cause cracking, glazing of the seal surface, or result in material transfer to the blade tip and subsequent seal spallation. For example, plasma sprayed abradable seals of the present inventions have resulted in blade tip and seal temperatures up to 300° F. lower when tested against porous seals utilizing a comparable volume percentage of the same nickel alloy, as a result of reduced friction due to the presence of boron nitride, and increased thermal conductivity due to higher seal density.

Figure 2:
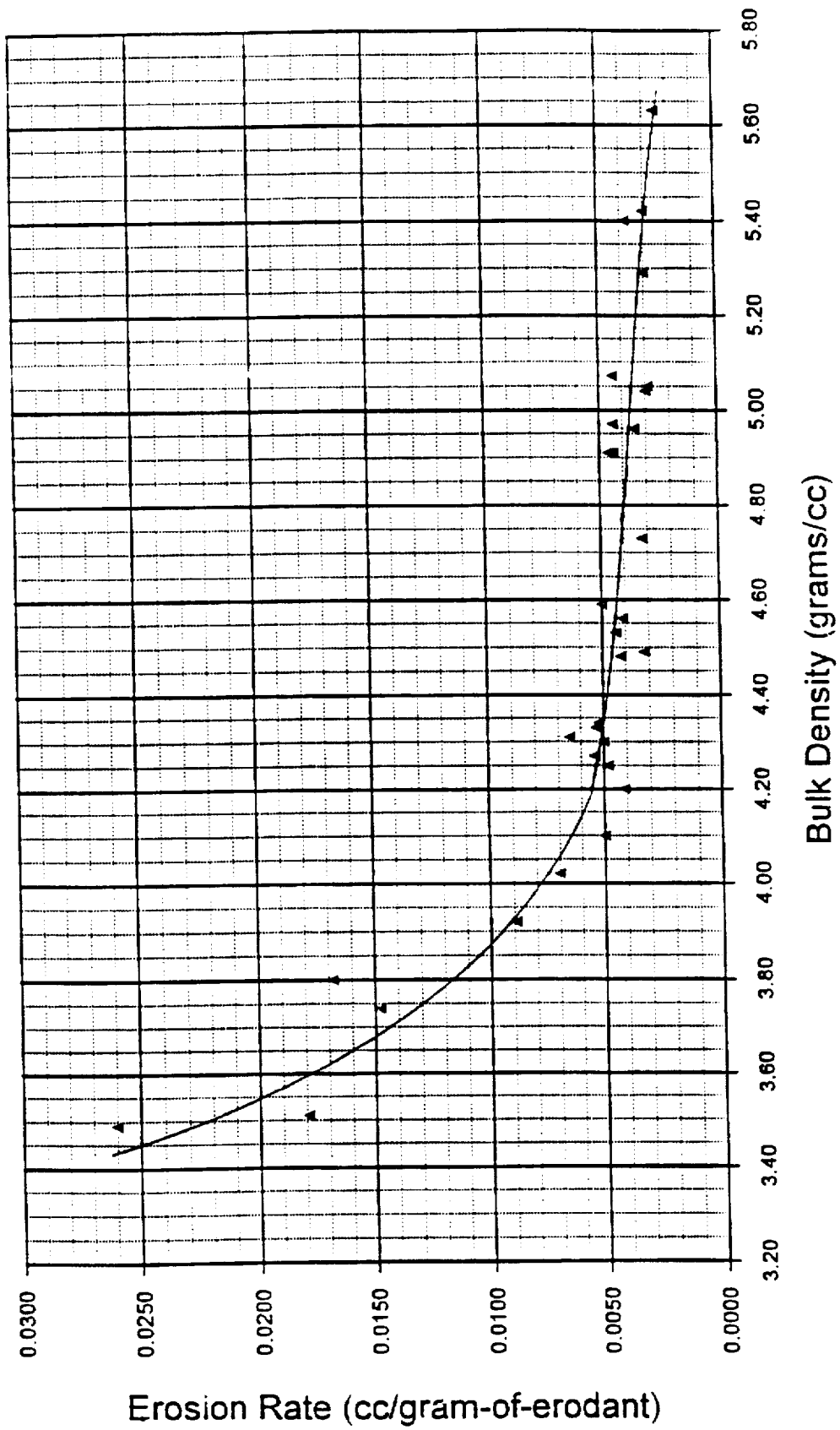
FIG. 2 illustrates erosion rig test results.

FIG. 2 illustrates the erosion resistance of the present invention. Feltmetal®, a commonly used porous seal material which comprises fibrous Haynes 188 cobalt based alloy, typically exhibits an erosion rate of from about 0.020 to about 0.065 cc/gram-of-erodant at a density of from about 1.6 to about 2.0 grams/cc, which parameters are outside the limits of this graph. A porous abradable seal, made with Lucite® as a fugitive particulate in the same matrix metal employed in the present invention, typically exhibits an erosion rate of from about 0.020 to about 0.030 cc/gram-of-erodant at a density of from about 2.8 to about 3.5 grams/cc, which parameters are outside the limits of the graph. The present invention, however, exhibits an erosion rate of less than 0.020 cc/gram-of-erodant, and preferably less than 0.010 cc/gram-of-erodant. As illustrated, the increased seal density of the seals containing particulate boron nitride lubricant provides additional erosion resistance compared to porous seals.

EXAMPLE 3

Significantly reduced porosity levels in the present seals contribute to reduced surface roughness compared with previous seals. In addition, the improved machinability of metal matrices containing boron nitride further improves the surface finish of the sprayed seals.

Table V illustrates the surface roughness of a number of seals made as in Example 1 as compared to the surface roughness of the commercially available porous seal material.

TABLE V

SURFACE ROUGHNESS [MICROINCHES]

| | Porous Seal | | Invention | |
|---|---|---|---|---|
| | Range | Average | Range | Average |
| As Sprayed | 900–1600 | 1250 | 375–620 | 548 |
| Single Point Machined | 700–900 | 800 | 100–600 | 150 |

EXAMPLE 4

Additional abradable seals were prepared as set forth in Example 1, and subjected to permeability measurements. Permeability of the seal layer was measured and found to be zero (0) percent at densities greater than 3.6 grams/cc. This is in contrast to porous plasma sprayed seals which exhibit about 75 percent permeability, or the commercially utilized Feltmetal® seals, which showed about 60 percent permeability.

EXAMPLE 5

Figure 3:
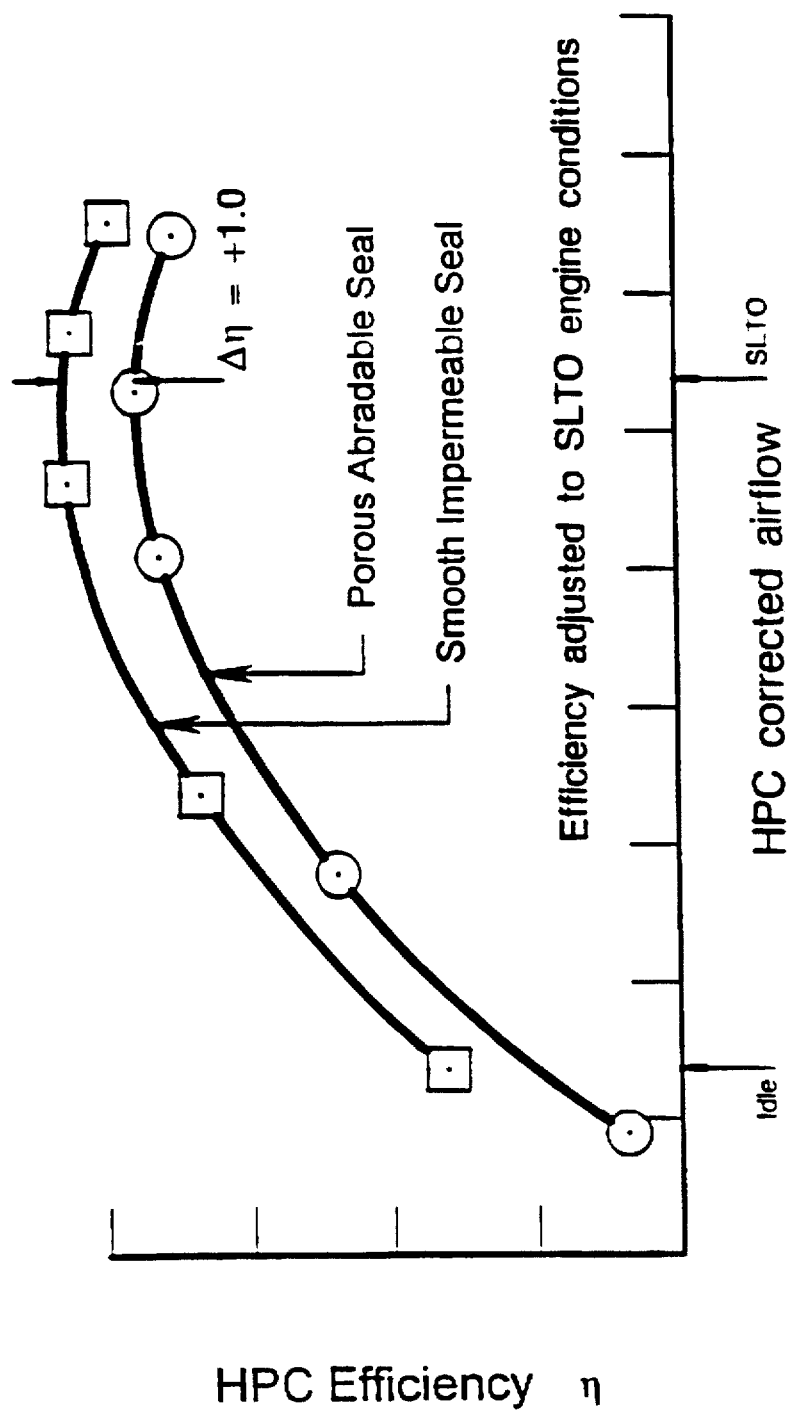
FIG. 3 illustrates results of efficiency tests.

In addition, compressor seals prepared in accordance with this invention were fabricated and tested in a gas turbine engine to determine the benefits of smooth, impermeable seals. Back-to-back engine tests demonstrated a significant increase in compressor efficiency of one percent attributable to the present invention, as compared to the use of rough, permeable compressor seals, as shown in FIG. 3. FIG. 3 illustrates the improved HPC efficiency (High Pressure Compressor efficiency) obtained when operating a smooth impermeable seal of the present invention, as compared to a conventional state-of-the-art porous abradable seal. A clear efficiency advantage of a full percentage point is attained at a wide variety of engine operating conditions. This efficiency differential is a major achievement in this technology, where improvements of 0.1 percent are considered a major accomplishment.

EXAMPLE 6

Figure 4:
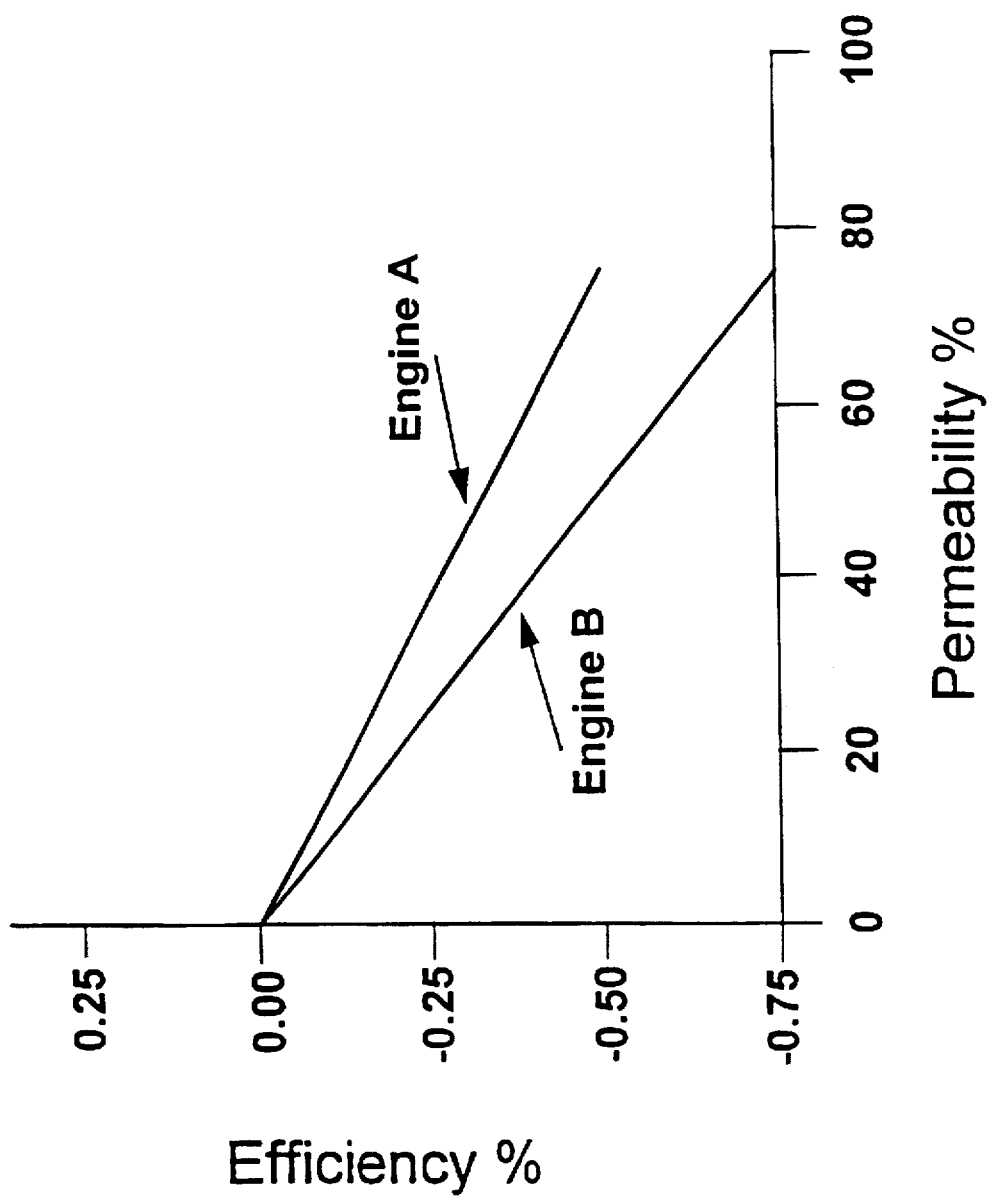
FIG. 4 illustrates the effect of permeability on efficiency.

Additionally, compressor seals prepared with varying degrees of permeability were tested in a full scale laboratory rig and varying size gas turbine engines to determine the effect of reduced seal permeability on engine efficiency. HPC efficiency increases attributable to the present invention, as compared to higher permeability conventional seals were demonstrated in back-to-back engine tests, as shown in FIG. 4. This Figure illustrates improvements to the 100% Peak Adiabatic Engine Efficiency of two different engine families. Engines A and B, respectively, amounting to about 0.5 and 0.75 percent, when operating with a seal made in accord with this invention as permeability approaches zero. This efficiency differential, again is a major achievement in this technology, where improvements of 0.1 percent are considered a major accomplishment.

Although this invention has been shown and described with respect to detailed and preferred embodiments thereof, it will be understood by those skilled in the art that various changes and modifications therein may be made without departing from the spirit and scope of the claimed invention.

What is claimed:

1. A method for producing a substantially gas impermeable abradable seal having a surface roughness of less than about 600 microinches and minimal interconnected pores, said method comprising:

a. Providing a metallic substrate;
   b. Plasma spraying onto said substrate a low porosity bond coat layer consisting essentially of a nickel based superalloy having a density greater than 90 percent theoretical, and having an oxidation resistance greater than that of nichrome at 1200° F., wherein said bond coat layer does not contain boron nitride; and
   c. Forming a substantially gas impermeable abradable seal having a surface roughness of less than about 600 microinches and minimal interconnected pores by plasma spraying over said bond coat layer an abradable layer comprising 50 to 65 volume percent oxidation resistant nickel based superalloy, 20 to 45 volume percent hexagonal boron nitride, and from about 5 to about 15 volume percent porosity.

2. The method as set forth in claim 1, wherein said plasma spraying is by multiple port plasma spray.

3. The method as set forth in claim 2, wherein independent powder injection and carrier gas flows are used for each constituent of the abradable layer.

4. The method as set forth in claim 3, wherein the nickel based superalloy used in both the bond coat layer and the abradable layer comprises, by weight, 5–26 percent Cr, 3–13.2 percent Al, 0.1–1.5 percent Hf, 0.001–0.80 percent Y, 0–5.0 percent Ti, 0–24 percent Co, 0–15 percent W, 0–4 percent Mo, 0–12 percent Ta, 0–0.2 percent Zr, 0–0.2 percent B, 0–0.25 percent C, 0–0.60 percent Si, 0–7.0 percent Re, 0–5.0 percent Cb, 0–0.2 percent iron, 0–0.1 percent copper, 0–0.05 percent of each of phosphorous, sulfur, lead, bismuth, and manganese, the balance essentially Ni.

5. The method as set forth in claim 4, wherein said bond coat layer has a thickness of from 2 to 20 mils, and said abradable layer has a thickness of from 10 to 200 mils and a density from about 3.7 to about 5.3 grams/cc.

6. The method as set forth in claim 5, wherein the thickness of said bond coat layer and said abradable layer are controlled by automated measurement means during application.

7. The method as set forth in claim 6, wherein the boron nitride particle size, prior to spraying, is from 44 to 177 microns, the particle size of the oxidation resistant superalloy, prior to spraying, is from 44 to 150 microns, and three injection ports are utilized for each.

8. The method as set forth in claim 7, wherein the superalloy comprises, by weight, 8.0–10.0 percent Cr, 6.6–7.0 percent Al, 9.0–10.0 percent W, 2.5–3.5 percent Ta, 0.1–1.2 percent Mo, 0.1–0.2 percent Hf, 0.01–0.08 percent Y, less than 0.02 percent C, less than 0.09 percent Si, less than 0.005 percent P, less than 0.005 percent S, less than 2 ppm Pb, less than 0.5 ppm Bi, less than 0.02 percent Mn, less than 0.1 percent Fe, less than 0.05 percent Cu, the balance Ni.

9. The method as set forth in claim 1, wherein said abradable seal has a surface roughness of from about 100 to about 600 microinches.

10. A method for producing a substantially gas impermeable abradable seal having a surface roughness of less than about 600 microinches and minimal interconnected pores, said method comprising:

a. Providing a metallic substrate;
   b. Plasma spraying onto said substrate a bond coat layer containing no boron nitride, said bond coat layer comprising, by weight, 5–26 percent Cr, 3–13.2 percent Al, 0.1–1.5 percent Hf, 0.001–0.80 percent Y, 0–5.0 percent Ti, 0–24 percent Co, 0–15 percent W, 0–4 percent Mo, 0–12 percent Ta, 0–0.2 percent Zr, 0–0.2 percent B, 0–0.25 percent C, 0–0.60 percent Si, 0–7.0 percent Re, 0–5.0 percent Cb, 0–0.2 percent iron, 0–0.1 percent copper, 0–0.05 percent of each of phosphorus, sulfur, lead, bismuth, and manganese, the balance essentially Ni; and
   c. Forming a substantially gas impermeable abradable seal having a surface roughness of less than about 600 microinches and minimal interconnected pores by applying to said bond coat layer, by multiple port injection plasma spraying, an abradable layer comprising 50–65 volume percent oxidation resistant superalloy, 20 to 45 volume percent hexagonal boron nitride, and from about 5 to about 15 volume percent porosity, wherein said superalloy comprises the same composition as said bond coat layer.

11. The method as set forth in claim 10, wherein the superalloy in said abradable layer comprises from 50 to 65 volume percent of said abradable layer, and comprises, by weight, 5–18 percent Cr, 3–8 percent Al, 0.1–1.0 percent Hf, 0.001–0.09 percent Y, 0–5 percent Ti, 0–20 percent Co, 0–15 percent W, 0–4 percent Mo, 0–12 percent Ta, 0–0.2 percent Zr, 0–0.2 percent B, 0–0.2 percent C, 0–7 percent Re, 0–5 percent Cb, 3–9 percent (Al+Ti), the sum of (W+Ta+Mo+Cb+Re) exceeding 5 percent, the balance nickel.

12. The method as set forth in claim 10, wherein the superalloy in said abradable layer comprises, by weight, 8.0–10.0 percent Cr, 6.6–7.0 percent Al, 9.0–10.0 percent W, 2.5–3.5 percent Ta, 0.1–1.2 percent Mo, 0.1–0.2 percent Hf, 0.01–0.08 percent Y, less than 0.02 percent C, less than 0.09 percent Si, less that 0.005 percent P, less than 0.005 percent S, less than 2 ppm Pb, less than 0.5 ppm Bi, less than 0.02 percent Mn, less than 0.1 percent Fe, less than 0.05 percent Cu, the balance Ni.

13. The method as set forth in claim 10, wherein said abradable seal has a surface roughness of from about 100 to about 600 microinches.

* * * * *